H. D. LICHTENSTEIGER.
LEVEL.
APPLICATION FILED JUNE 28, 1917.
1,280,253.
Patented Oct. 1, 1918.
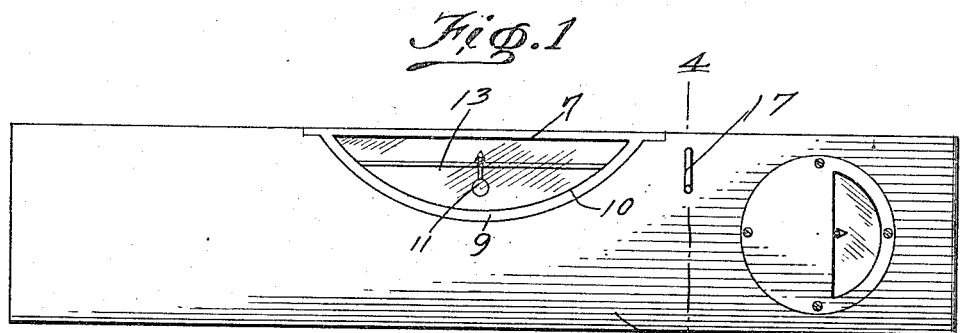
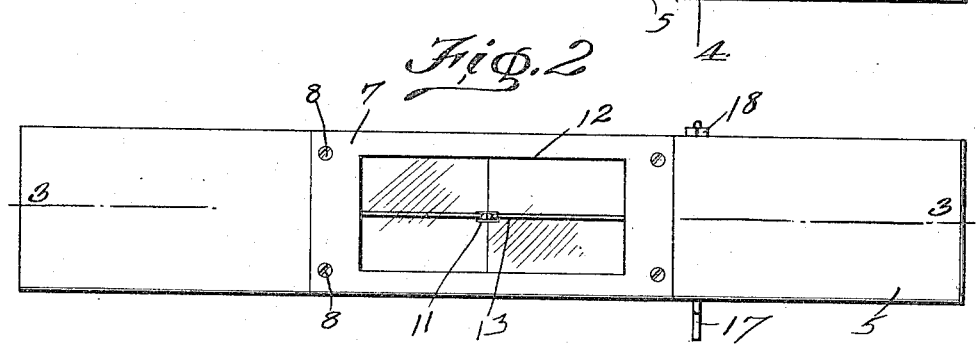
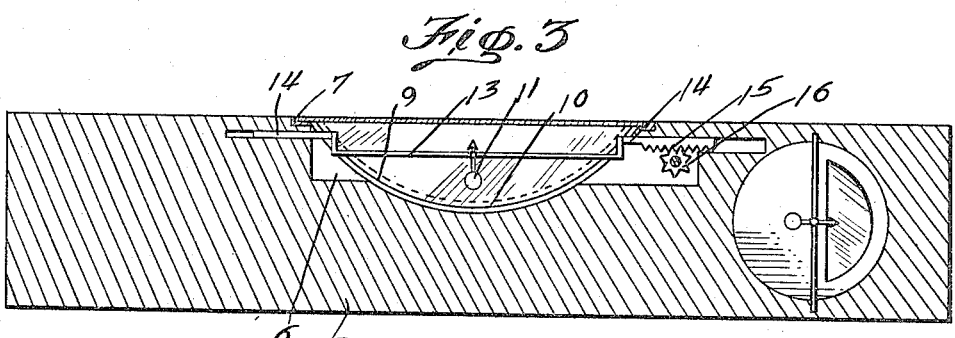
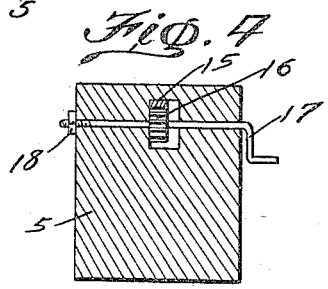
Inventor
H.D. LICHTENSTEIGER

UNITED STATES PATENT OFFICE.

HENRY D. LICHTENSTEIGER, OF CAMPBELLSPORT, WISCONSIN.

LEVEL.

1,280,253. Specification of Letters Patent. Patented Oct. 1, 1918.

Application filed June 28, 1917. Serial No. 177,524.

*To all whom it may concern:*

Be it known that I, HENRY D. LICHTENSTEIGER, a citizen of the United States, residing at Campbellsport, in the county of Fond du Lac, State of Wisconsin, have invented certain new and useful Improvements in Levels; and I do hereby declare the following to be a full, clear, and exact description of the invention, such as will enable others skilled in the art to which it appertains to make and use the same.

This invention is an improvement in measuring instruments and has particular reference to a level.

An object of the invention is to provide an improved means for supporting a weighted plumb within the housing of a level so that the plumb may be adjusted should the same deviate from its proper normal position owing to defects in the body of the level.

Another object is to provide a level of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a side elevation of the level constructed in accordance with the invention.

Fig. 2 is a top plan view thereof.

Fig. 3 is a longitudinal section on the line 3—3 of Fig. 2.

Fig. 4 is a transverse section on the line 4—4 of Fig. 1.

In the drawing, the numeral 5 indicates the body portion of the level which may be of any desired construction and made of any material and which is provided in its upper portion with a recess 6 in which a housing 7 is mounted and secured to the upper ends of the level by screw fasteners 8, the main or body portion 9 of the housing being of substantially semi-circular formation in side elevation and provided with oppositely disposed openings 10 covered by glass or other transparent material whereby the plumb 11 mounted therein is visible from the sides of the level. The top of the housing is also provided with an opening 12 covered by glass so that the plumb is visible from the upper edge of the level.

The plumb 11 is pivotally supported in a frame 13 slidably mounted in the housing 9, the ends of the frame 13 having the extensions 14 which project through the ends of the body portion 9 directly beneath the ends of the top plate of said housing. One of the extensions 14 is provided upon its under surface with a rack bar 15 engaged by a cog 16 mounted in the body portion of the level and rotated by a handle 17 to slidingly adjust the frame 13 in the housing 7. This handle extends transversely through the body 5 and is provided with a nut 18 for the purpose of securing the same in adjusted positions. This adjustment of the frame 13 is provided for the purpose of neutralizing unequal shrinkage at opposite ends of the body of the level when the same is formed of wood. By this adjustment the plumb 11 may be shifted to aline with the mark extending transversely across the glass covering of the housing 7 should the latter be distorted or shifted by the shrinkage in the wood body.

What is claimed is:—

A level comprising a body portion, a housing mounted therein and arcuate in formation, an adjustable frame mounted in said housing and having end extensions, one of which is provided with a rack bar, a cog wheel mounted in the body portion of the level and engaging said rack bar to adjust the frame longitudinally of the housing, and an indicating plumb supported in said frame.

In testimony whereof, I affix my signature in the presence of two witnesses:

HENRY D. LICHTENSTEIGER.

Witnesses:
STEPHEN BONESPO,
JAMES FARRELL.

Copies of this patent may be obtained for five cents each, by addressing the "Commissioner of Patents, Washington, D. C."